United States Patent [19]

Ball

[11] 4,414,776

[45] Nov. 15, 1983

[54] FIBROUS WEB FOR PLANTING SEEDS, METHOD OF USING SAME, APPARATUS FOR PRODUCING SAME

[76] Inventor: Harry J. Ball, P.O. Box 3009, Milford, Conn. 06460

[21] Appl. No.: 363,078

[22] Filed: Mar. 29, 1982

Related U.S. Application Data

[63] Continuation-in-part of Ser. No. 169,856, Jul. 17, 1980, Pat. No. 4,357,780, which is a continuation-in-part of Ser. No. 971,603, Dec. 30, 1978, abandoned.

[51] Int. Cl.$^3$ .............................................. A01C 1/04
[52] U.S. Cl. .............................................. 47/56; 47/9
[58] Field of Search ....................................... 47/56, 9

[56] References Cited

U.S. PATENT DOCUMENTS

| | | | |
|---|---|---|---|
| 526,512 | 9/1894 | Weber et al. | 47/56 |
| 776,246 | 11/1904 | Kanst | 47/56 X |
| 1,971,504 | 8/1934 | Pratt | 47/56 |
| 1,978,102 | 10/1934 | Clapp | 47/56 X |
| 2,605,589 | 8/1952 | Kuestner | 47/56 |
| 2,842,897 | 7/1958 | Finn | 47/9 |
| 2,909,003 | 10/1959 | Marshall | 47/56 |
| 3,160,986 | 12/1964 | Watson et al. | 47/56 |
| 3,292,307 | 12/1966 | Finn | 47/9 |
| 3,303,609 | 2/1967 | MacHenry | 47/9 |
| 3,427,194 | 2/1969 | Lippoldt et al. | 47/9 X |
| 3,516,196 | 6/1970 | Lippoldt et al. | 47/56 |
| 3,557,491 | 1/1971 | Franklin et al. | 47/56 |
| 3,583,099 | 6/1971 | Fata | 47/56 |
| 3,863,388 | 2/1975 | Loads | 47/56 |
| 3,888,041 | 6/1975 | Seith et al. | 47/9 |
| 3,889,417 | 6/1975 | Wood et al. | 47/9 X |
| 3,914,901 | 10/1975 | Muldner | 47/56 |
| 4,066,490 | 1/1978 | Yoshimi | 47/56 |
| 4,364,197 | 12/1982 | Baron | 47/56 |

FOREIGN PATENT DOCUMENTS

| | | | |
|---|---|---|---|
| 811081 | 4/1969 | Canada . | |
| 1582123 | 7/1977 | Fed. Rep. of Germany | 47/56 |

Primary Examiner—Robert E. Bagwill
Attorney, Agent, or Firm—Zarley, McKee, Thomte, Voorhees & Sease

[57] ABSTRACT

A fibrous web for planting seeds consists essentially of a mat of randomly oriented, unmodified, natural straw-like cellulosic fibers, viable seeds, water soluble adhesive and fertilizer on a tissue paper backing. A method of sowing an area of soil with seeds comprising laying the aforementioned web over the area. Apparatus for producing the aforementioned web comprises a conveyor belt, means for driving the conveyor belt, means for placing tissue paper backing on the conveyor belt, means for depositing onto the tissue paper backing on the conveyor belt while it is driven dry, fluffed randomly oriented, unmodified, natural cellulosic fibers to form a layer thereof on the conveyor belt, means for leveling the fluffed layer to form a mat, means for spraying an aqueous solution of water soluble adhesive onto the mat, means for depositing seed and fertilizer onto the wet adhesive bearing mat and means for drying the wet mat containing adhesive, seed and fertilizer.

7 Claims, 3 Drawing Figures

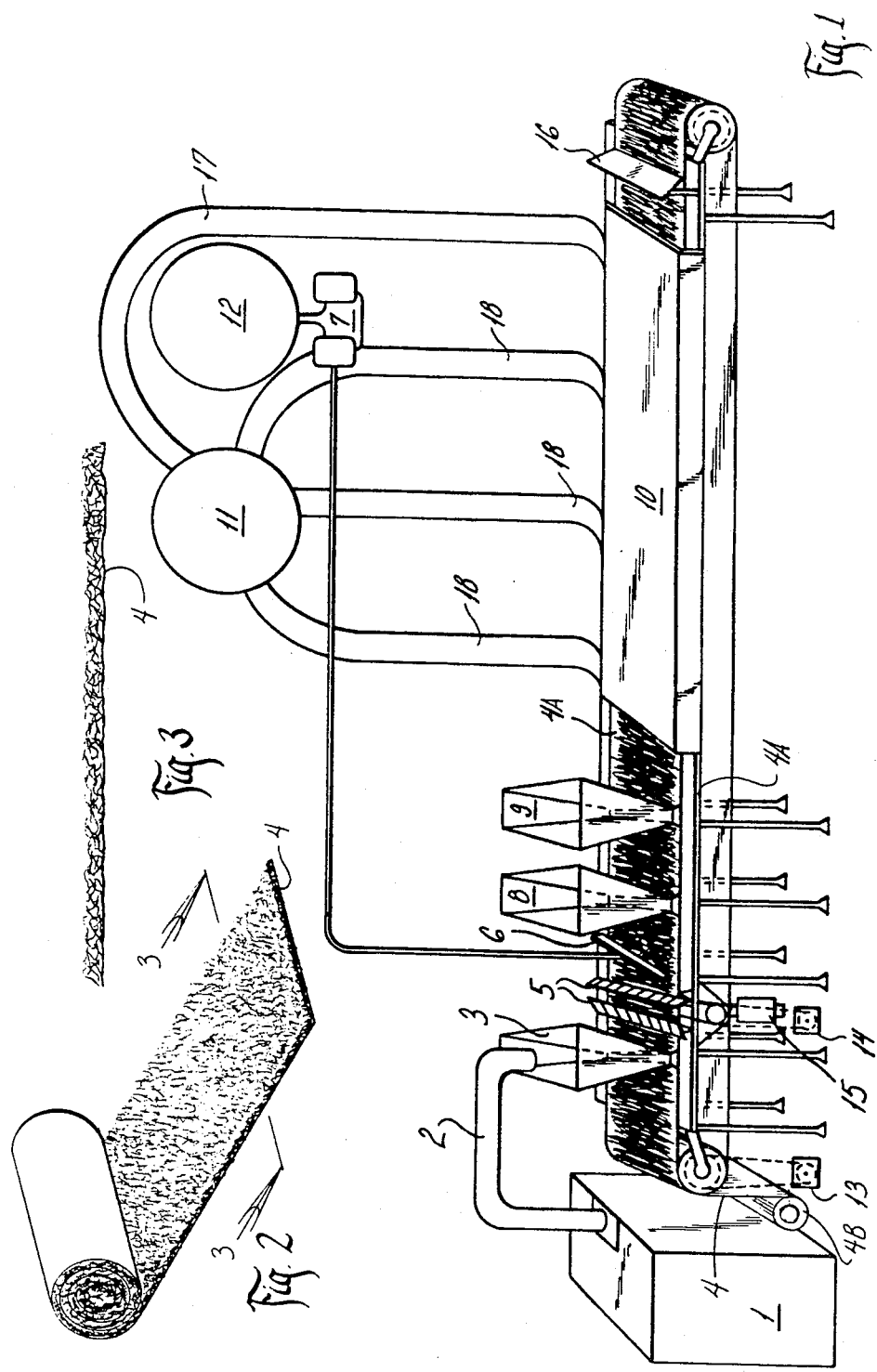

FIBROUS WEB FOR PLANTING SEEDS, METHOD OF USING SAME, APPARATUS FOR PRODUCING SAME

This application is a continuation-in-part application of Application Ser. No. 169,856, July 17, 1980 (now U.S. Pat. No. 4,357,780), which is a continuation-in-part application of Application Ser. No. 971,603, Dec. 30, 1978 (now abandoned).

BACKGROUND OF THE INVENTION

This invention relates to a fibrous web for planting seeds, the method of sowing an area of soil with seeds by using the fibrous web and an apparatus for producing the fibrous web.

The conventional planting of grass, flower and other seeds frequently is inefficient. Particularly in connection with the establishing of new lawns, the conventional sowing of seeds results in a substantial waste of seed and, moreover, is time-consuming and tedious.

It is an object of the present invention to provide a fibrous web for planting seeds the use of which is easier and less wasteful of seeds than the conventional sowing of seeds.

It is a further object of the invention to provide a method of sowing an area of soil with seeds comprising using the aforementioned web.

It is also an object of the invention to provide an apparatus for producing the aforementioned web.

Other objects and advantages of the invention will be apparent to one of ordinary skill in the art from the description of the invention hereinbelow.

The mat of the co-pending parent applications differed from the mat of this application by the absence of a backing of tissue paper. It has been found that the addition of the tissue paper backing improves the structural integrity of the mat for storage, rolling and unrolling without adding significantly to cost while preserving the desirable features of the mat without tissue paper backing. The mat is prepared without compressing and the straw fibers remain in a generally fluffy condition.

Before the invention is described, a review of prior art in the general field of the invention will be given.

In U.S. Pat. No. 2,909,003, seeds are distributed over an adhesive-free open lofty web of textile fibers and in the interstices thereof.

U.S. Pat. No. 3,863,388 relates to a form of turf in which seeds are germinated in a rooting medium, namely, soil or peat or exfoliated minerals or interconnecting open cell decomposable cellular resin foam materials supported on a mesh overlying a sheet or other solid structure.

U.S. Pat. No. 3,914,901 relates to a mat roll for starting a lawn or other vegetation comprising a web sheet having viable seeds embedded therein, the sheet comprising sphagnum peat moss and a binder such as sodium silicate.

U.S. Pat. No. 2,826,865 relates to a seed carrier having a laminated structure, each layer being composed of heterogeneously arranged natural cellulosic or synthetic fibers, the layers being sewn together with loosely twisted thread.

U.S. Pat. No. 3,160,986 relates to a seed carrier in the form of a plastic film onto which the seed is held by means of a water-soluble adhesive.

U.S. Pat. No. 3,583,099 relates to rigid tiles containing seeds. The tiles are made of clay and binder.

U.S. Pat. No. 3,516,196 relates to a seed mat comprised of a biodegradable paper sheet coated with an asphalt adhesive binding seeds to the upper surface of the biodegradable paper sheet.

U.S. Pat. No. 1,971,504 relates to a seed carrier comprising a cotton netting or paper backing supporting a layer of water soluble fertilizer, a flexible plastic layer and flexible adhesive adhering the seeds to the plastic layer.

U.S. Pat. No. 3,303,609 relates to a mixture including thin-walled hydrophilic regenerated cellulose fibers, wood fibers, fertilizer and grass seed.

U.S. Pat. No. 3,292,307 relates to a mixture including fiberglass, cellulose fiber, seeds and fertilizer.

U.S. Pat. No. 3,557,491 relates to a permeable fabric or film treated on one side with a carrier containing seeds, the fabric being coated with asphalt on the other side or being at least partially saturated with asphalt.

U.S. Pat. No. 3,888,041 relates to a knitted fabric mulch into which may be incorporated seed tapes.

U.S. Pat. No. 3,889,417 relates to a plastic foam carrying seeds.

U.S. Pat. No. 2,605,589 relates to a sod unit in which seeds are carried on humus or peat moss covered with sand and overlying a plastic mesh.

Canadian Pat. No. 811,081 relates to a compressed peat containing seeds.

SUMMARY OF THE INVENTION

According to the invention, there is provided a fibrous web for planting seeds, consisting essentially of a mat of randomly oriented, unmodified, natural straw-like cellulosic fibers, viable seeds, water soluble adhesive and fertilizer on a tissue paper backing.

The terminology "unmodified, natural" is intended to exclude fibers which initially were natural but are presently not in a natural state, such as regenerated cellulosic fibers. The term "straw-like" is intended to include straw and similar materials which are readily recognizable as being straw-like, such as corn husks and other wastes from the harvesting of crop lands. These are characterized by being of relatively long fiber length and relatively rigid but flexible and, therefore, forming webs with a considerable degree of permeability without the necessity of puncturing or similarly processing the webs.

The preferred "straw-like" material is from stalks of grain which are single, coarse, dry stems produced after threshing and are chopped to an average length of one and a half inches and ranging from approximately three-quarters of an inch to two inches.

According to another aspect of the invention, there is provided a method of sowing an area of soil with seeds comprising laying over the area the aforementioned web. The soil generally requires no preparation at all or, at most, a moderate surface breaking.

The seeds selected are viable so that they will germinate after the product of the invention has been laid onto the soil.

Typical water soluble adhesives which may be used according to the present invention are protein and protein derivative adhesives including those made from casein, zein, soybean proteins, and other proteins and the type of glues made from hides, bones, and so forth, fish glues from fish offal, and those made from blood albumen, adhesives made from materials such as starch and vegetable gums, comprising adhesives made from starch and processed starch, the dextrins, and the water soluble gums such as gum arabic, ghatti, tragacanth, Indian gum and the like. Cellulose adhesives which are principally cellulose derivatives such as methyl cellulose, ethyl cellulose and sodium carboxymethyl cellulose.

The preferred adhesive is polyvinyl acetate which is flexible when dry. This glue is available through Adhesive Compounds, Inc., Des Moines, Iowa.

Common water soluble fertilizer may be used in the present invention. Typical of these are ammonium sulfate, calcium nitrate, ammonium nitrate, urea, monocalcium and ammonium phosphates, single superphosphate, wet-process orthophosphoric acid, triple superphosphate, ammonium phosphates, nitrophosphates, nonorthophosphates and so forth and various mixtures of the foregoing.

The seeds themselves may be any grass, flower or other seeds which it is desired to sow. Generally speaking, it is anticipated that the present invention will find its greatest utility in the establishment of lawns and flower beds, but it certainly is not limited to these particular applications.

The rolled seeded and fertilized straw mulch mat with tissue paper backing derives its entire structural strength and unity from the tissue paper backing on which randomly oriented straw pieces are bonded together and to the tissue paper backing by the adhesive in a fluffy state wherein the seed is only on the side of the mat opposite the tissue paper backing, the side facing downwardly when the mat is applied to the ground and is secured to the individual straw pieces by adhesive on the straw making spot contact only with the seed and fertilizer.

The invention will now be further described by reference to a specific, preferred embodiment thereof, as illustrated in the accompanying drawing.

BRIEF DESCRIPTION OF THE DRAWING

FIG. 1 of the drawing is an isometric view, in partially schematic form, of an apparatus for producing a fibrous web in accordance with the invention.

FIG. 2 is a perspective view of a mat being unrolled onto the ground to be seeded and fertilized.

FIG. 3 is a cross-sectional view taken along line 3—3 in FIG. 2.

DESCRIPTION OF THE PREFERRED EMBODIMENT

The apparatus illustrated in FIG. 1 includes a bin 1 for holding chopped mulch such as straw which ultimately forms the base for the product of the invention. A conduit 2 including conventional elevator and transport means conveys the dry straw from the bin 1 to a conventional feed hopper 3 which evenly distributes the straw in a fluffy condition onto tissue paper backing 4 on the top surface of a conveyor belt 4A which is driven by a variable speed motor 13 in the direction away from the bin 1. The tissue paper is supplied from a roll 4B which is fed onto the conveyor belt 4A.

The distributed straw on the tissue paper backing 4 on conveyor belt 4A passes beneath a pair of opposed augers 5 that firm and level the straw to form a mat of substantially uniform thickness. A variable speed motor 14 drives the augers. Another motor 15 can raise and lower the augers thereby to adjust the thickness of the mat being formed.

Downstream from the augers 5, a sprayhead 6 applies by means of a pump 7 from a reservoir 12 a hot aqueous solution of water soluble glue at a pressure of approximately 10-12 p.s.i. Thereafter, granular fertilizer and grass seed are gravity fed from respective hoppers 8 and 9 into spot contact with the adhesive on the straw. The thus prepared product according to the invention, still wet from the adhesive, is fed into a drying tunnel 10 surrounding a portion of the upper run of the conveyor belt 4A.

The amount of adhesive used is only enough to provide the spot contact bonding between contiguous fibers and with the granular material and between the fibers and the tissue paper backing.

A conventional heating oven 11 provies hot air for the drying tunnel 10. Preferably, two 400,000 b.t.u. gas-fired furnaces are used. Hot air is fed to the tunnel 10 through ducts 18 and air is recirculated from near the downstream end of the tunnel 10 to the oven 11 through return duct 17. Downstream from the tunnel 10, a conventional cutter 16 cuts the finished mat product of the invention into pieces of desired length.

The preferred resulting product is three-sixteenths inch—one-quarter inch in depth and includes five to eight straws in thickness. The mat will weigh from three and a half to four and a half pounds per fifty square feet including straw, adhesive, fertilizer, seeds, and tissue paper which equals 1.1 ounce to 1.4 ounce per square foot or 110 ounces per three hundred square feet. The individual straws will average one and a half inches in length and vary from three-quarters inch to two inches.

With little or no surface breaking of the soil, a lawn is readily established simply by laying out the mats according to the invention on the soil. The seeds and fertilizer are retained essentially on the side of the mat opposite the tissue paper backing by the adhesive. Since the adhesive is water soluble, when it rains or the mat is artifically watered, the adhesive dissolves and the seeds and fertilizer are released and find their way into soil. The straw prevents the seeds from being blown away and inhibits the growth of weeds. Since the straw and tissue paper are biodegradable, they eventually become part of the soil.

While the invention has been described by reference to a specific, preferred embodiment thereof, it is to be understood that the scope of the invention, as defined by the appended claims, is also intended to include all modifications and variations which would be obvious to one of ordinary skill in the art.

I claim:

1. The method of forming a fluffy uncompressed rolled seeded or unseeded straw-like mulch mat capable of being unrolled, which derives its entire structural strength and unity from tissue paper backing on which randomly oriented, unmodified, natural, elongated, straw-like cellulosic fibers, bonded together through spot contact bonding between contiguous straws and between the tissue paper backing and the straws by a water soluble adhesive which due to the mat's density and thickness is spread substantially throughout, including the steps of,
   feeding onto tissue paper backing on a conveyor a mat of fluffy randomly oriented, unmodified, natural, elongated and dry straw-like cellulosic fibers,
   spraying water soluble adhesive onto said straw-like cellulosic fibers,
   spreading onto the adhesive a predetermined amount of granular material from the class comprising seed and fertilizer, drying the adhesive and thereby bonding the straw-like fibers together and to the tissue paper backing and securing the granular material to the straw-like fibers by the adhesive on the straw-like fibers providing spot contact bonding only between contiguous fibers and with the granular material, and rolling the mat into a roll for storage and unrolling at the location of use.

2. The method of forming a fluffy uncompressed seeded straw mulch mat which derives its entire structural strength and unity from tissue paper backing on which randomly oriented, unmodified, natural, elongated, straws, bonded together through spot contact bonding between contiguous straws and between the tissue paper backing and the straws by a water soluble adhesive which due to the mat's density and thickness is spread substantially throughout, including the steps of, feeding onto tissue paper backing on a conveyor a mat of fluffy randomly, oriented, unmodified, natural, elongated and dry straw, spraying water soluble adhesive onto said straws, spreading onto the adhesive a predetermined amount of granular seed and fertilizer, drying the adhesive and thereby bonding the straws together and to the tissue paper backing through spot contact bonding of contiguous straws, and securing the granular material to the straws by the adhesive on the straws making spot contact only with the granular seed and fertilizer.

3. A seeded and fertilized mulch mat having a thickness and density which derives its entire structural strength and unity from tissue paper backing on which randomly oriented, unmodified, natural, elongated, straws are secured and bonded together through spot contact bonding between contiguous straws and between the tissue paper backing and the straw by water soluble adhesive without the application of compression and including seed and fertilizer distributed uniformly over said straws opposite said tissue paper backing, and secured to said straws by said adhesive on said straws making spot contact only with said seed and fertilizer.

4. The mat of claim 3 wherein the thickness is between 3/16 to ¼ inches.

5. The mat of claim 3 wherein the weight of the mat is between 3½ to 4½ pounds per fifty square feet.

6. The mat of claim 3 wherein the thickness is between 3/16 to ¼ inches and the weight is between 3½ to 4½ pounds per fifty square feet.

7. The mat of claim 3 wherein said mat is rolled.

* * * * *